US009753676B1

(12) United States Patent
Panda et al.

(10) Patent No.: US 9,753,676 B1
(45) Date of Patent: Sep. 5, 2017

(54) SYSTEM AND METHOD FOR MANAGING PRINTING DEVICES USING ACTIVITY SCORES

(71) Applicant: KYOCERA Document Solutions Inc., Osaka (JP)

(72) Inventors: Debashis Panda, Pleasant Hill, CA (US); Oleksandr Zinchenko, Concord, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/062,544

(22) Filed: Mar. 7, 2016

(51) Int. Cl.
*H04N 1/04* (2006.01)
*G06F 3/12* (2006.01)

(52) U.S. Cl.
CPC .......... *G06F 3/1203* (2013.01); *G06F 3/1226* (2013.01); *G06F 3/1236* (2013.01); *G06F 3/1237* (2013.01)

(58) Field of Classification Search
CPC .... G06F 3/1203; G06F 3/1226; G06F 3/1236; G06F 3/1237
USPC ................. 358/1.15, 1.14, 1.9, 474
See application file for complete search history.

(56) References Cited

U.S. PATENT DOCUMENTS

| 5,343,276 | A | * | 8/1994 | Yamashita | ......... G03G 15/5079 399/10 |
| 5,786,994 | A | * | 7/1998 | Friz | ..................... G06F 11/3485 345/660 |
| 8,161,202 | B2 | | 4/2012 | Yasui | |
| 2014/0078540 | A1 | * | 3/2014 | Ishida | ................ H04N 1/00233 358/1.13 |

* cited by examiner

*Primary Examiner* — Houshang Safaipour
(74) *Attorney, Agent, or Firm* — McDonnell Boehnen Hulbert & Berghoff LLP

(57) ABSTRACT

The present disclosure is directed to a system, a method, and a device for monitoring printing devices using activity scores. In example embodiments, one or more printing devices are polled to monitor associated device states. A management device, using the associated device state and one or more requests transmitted to each of the one or more printing devices, generates an activity score. By comparing activity scores of the one or more printing devices, the management device can rank the printing devices against one another and assign priority levels to each printing device. These priority levels can then be used to establish frequencies for future polling of the one or more printing devices.

20 Claims, 10 Drawing Sheets

| Activity for Device Number 1 (IP Address 192.168.1.1) |||
|---|---|---|
| Activity Time (402) | Activity Type (404) | Activity Weightage (406) |
| 7:18 AM | Print Request Transmitted | 1 |
| 7:33 AM | Scanning Event Occurred | 2 |
| 7:34 AM | Out of Paper Indicated | 5 |
| 7:34 AM | Print Request Transmitted | 1 |
| 7:37 AM | Paper Tray Manually Refilled | 3 |
| 7:55 AM | Paper Jam Indicated | 5 |
| 8:03 AM | Paper Jam Manually Cleared | 3 |
| Total Activity Score (410): || 20 |

Figure 4

| Device IP Address (502) | Activity Score (504) | Priority Level (506) |
|---|---|---|
| 192.168.1.2 | 150 | Urgent |
| 192.168.1.6 | 88 | High |
| 192.168.1.3 | 63 | Medium |
| 192.168.1.9 | 32 | Medium |
| 192.168.1.1 | 20 | Low |
| 192.168.1.7 | 15 | Low |
| 192.168.1.5 | 3 | Low |
| 192.168.1.4 | 0 | Low |
| 192.168.1.8 | 0 | Low |

Figure 5

SYSTEM AND METHOD FOR MANAGING PRINTING DEVICES USING ACTIVITY SCORES

BACKGROUND

Unless otherwise indicated herein, the materials described in this section are not prior art to the claims in this application and are not admitted to be prior art by inclusion in this section.

In recent years, various types of printing devices have become popular for both business and consumer use. In addition to traditional black and white printers, color printers, scanners, copiers, fax machines, and other components are now common. Multifunctional products (MFPs), which support two or more of these operations, are also widely available.

In some instances, multiple printing devices may be on a network for use by one or more user devices. These printing devices may be managed by a management device.

In order to maintain information regarding the state of the printing devices, the management device may poll each of the printing devices for information about the current device state, especially in networks where the printing devices cannot push their status to the management device.

Particularly if the management device has a small amount of processing resources available, or if there is a large number of managed devices, it may be necessary or desirable to limit the frequency with which the management device polls the printing devices.

SUMMARY

Disclosed herein are embodiments that relate to a system, a method, and a device for monitoring printing devices using activity scores.

In one aspect, a printing device management system includes one or more printing devices. Each of the one or more printing devices has one or more associated device states. The system also includes a management device. The management device includes a printing device controller configured to poll each of the one or more printing devices for the one or more associated device states. The printing device controller is additionally configured to transmit one or more requests to each of the one or more printing devices. Further, the management device includes a non-transitory, computer-readable medium with instructions stored thereon. When a processing device within the management device executes the instructions, the processing device performs to maintain an activity score for each of the one or more printing devices. The activity score is based on the one or more associated device states and the one or more requests, both defined over a first specified length of time. When executing the instructions, the processing device also performs to rank each of the one or more printing devices based on the activity score of each of the one or more printing devices. Furthermore, when executing the instructions, the processing device performs to establish a frequency, for each of the one or more printing devices, over which to poll each of the one or more printing devices. The frequency for each of the one or more printing devices is based to the rank of each of the one or more printing devices.

In a different aspect, a method for managing one or more printing devices includes polling, by a device controller within a management device, one or more printing devices. Each of the one or more printing devices has one or more associated device states. The method further includes maintaining, by a processing device within the management device executing a set of instructions stored on a non-transitory, computer-readable medium, an activity score for each of the one or more printing devices. The activity score is based on the one or more associated device states and one or more requests transmitted from the device controller to each of the one or more printing devices, both defined over a first specified length of time. Additionally, the method includes ranking, by the processing device within the management device executing a set of instructions stored on a non-transitory, computer-readable medium, each of the one or more printing devices based on the activity score of each of the one or more printing devices. The method also includes establishing, by the processing device within the management device executing a set of instructions stored on a non-transitory, computer-readable medium, a frequency, for each of the one or more printing devices, over which to poll each of the one or more printing devices. The frequency for each of the one or more printing devices is based on the rank of each of the one or more printing devices.

In a third aspect, a management device configured to manage printing devices includes a printing device controller. The printing device controller is configured to poll each of one or more printing devices for one or more associated device states. The printing device controller is also configured to transmit one or more requests to each of the one or more printing devices. The management device further includes a non-transitory, computer-readable medium, with instructions stored thereon. When a processing device within the management device executes the instructions, the processing device performs to maintain an activity score for each of the one or more printing devices. The activity score is based on the one or more associated device states and the one or more requests, both defined over a first specified length of time. When executing the instructions, the processing device additionally performs to rank each of the one or more printing devices based on the activity score of each of the one or more printing devices. When executing the instructions, the processing device also performs to establish a frequency, for each of the one or more printing devices, over which to poll each of the one or more printing devices. The frequency for each of the one or more printing devices is based on the rank of each of the one or more printing devices.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 4 is an illustration of a set of printing device activities, as monitored by the management device, according to example embodiments.

FIG. 5 is an illustration of an ordered list of multiple monitored printing devices, according to example embodiments.

DETAILED DESCRIPTION

Figure 1:
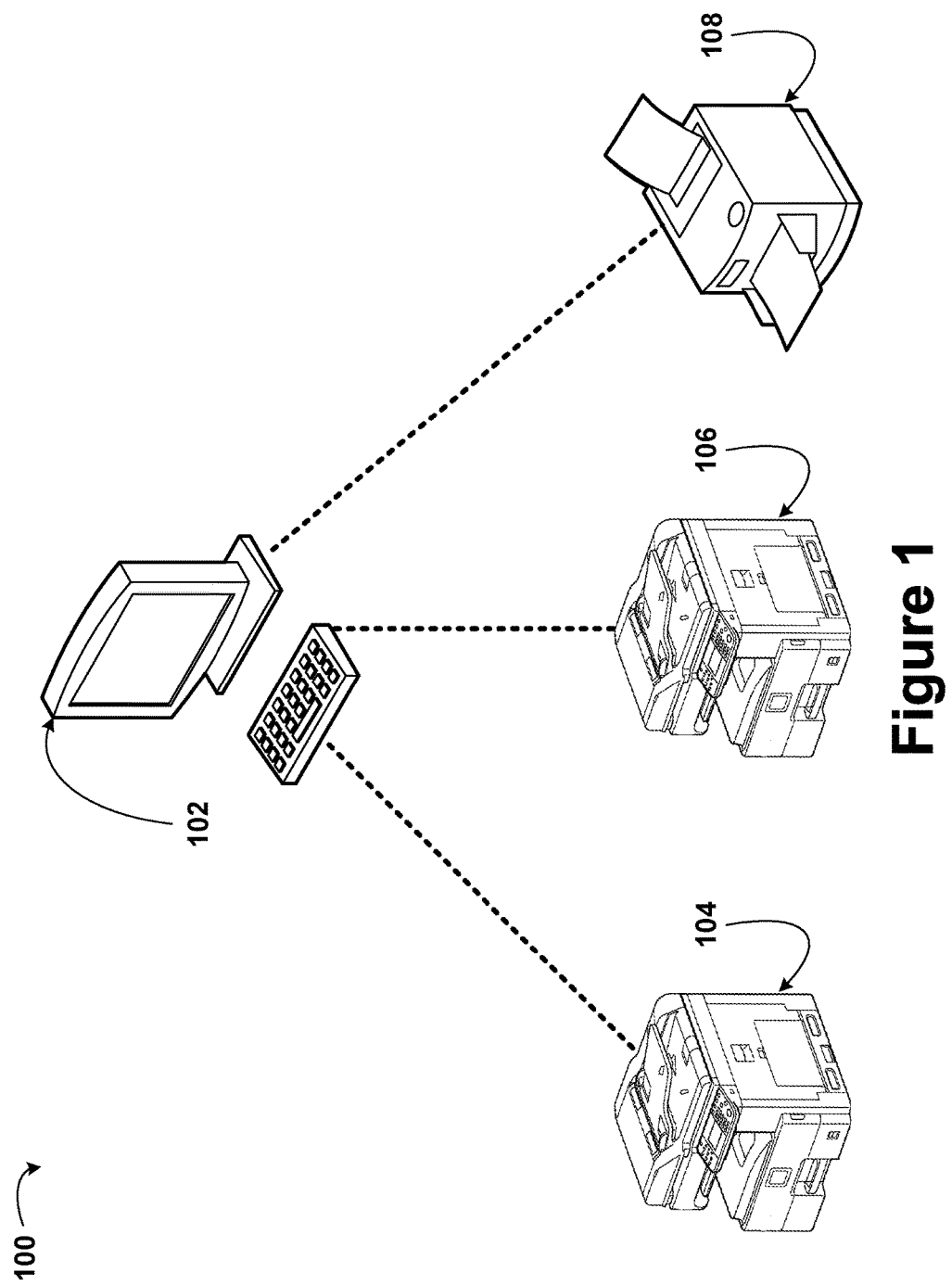
FIG. 1 is an illustration of a printing device management system, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

I. OVERVIEW

Example embodiments employ a management device to monitor the status of one or more printing devices through the use of activity scores associated with each of the devices.

The activity scores may be curated as an amalgamation of various activities that relate to the functioning of the one or more printing devices. Using the activity scores, the one or more printing devices can be ranked against one another. Then, based on the ranking, the printing devices can be associated with one or more priority levels. These priority levels may correlate to frequencies with which the printing devices are polled by the management device for status updates.

In one embodiment, the management device maintains a list of all activities occurring within a printing device and requests transmitted to the printing device over a specific period of time. Each activity and request are assigned associated activity weightages that indicate how much each activity and request should impact activity score. When a new request is issued to a printing device or an activity is executed by a printing device, the management device updates the list of all activities for the respective printing device. By aggregating all activities for an individual printing device, including associated activity weightages, the management device creates an activity score for that device.

The management device then ranks the activity score for that printing device against the activity scores for other printing devices, determined over the same period of time. Those printing devices with higher activity scores, therefore, are more frequently used and/or are in more frequent need of servicing.

This ranking of activity scores is used by the management device to associate priority levels with each of the printing devices. In some example embodiments, there may be hundreds or thousands of printing devices assigned to one management device. Because the management device has limited computing resources, the time it spends curating the list of activity scores for any one printing device may be allocated based on the importance of that printing device. The priority levels associated by the management device serve as a label, in addition to the activity score, by which the management device identifies the importance of a given printing device.

The printing devices that are associated with higher priority levels are thus monitored more closely and polled for status updates more frequently. Those printing devices with lower priority levels are polled less frequently.

The activity scores and resulting priority levels may be continuously updated by the management device, in some embodiments. Furthermore, the activity scores may be reset to a base level every specified amount of time to allow newly managed printing devices to populate competitive activity scores based on recent activities.

II. EXAMPLE SYSTEMS

FIG. 1 is an illustration of an image forming system 100, according to example embodiments. The system 100 includes a management device 102 and one or more printing devices 104, 106, 108.

Figure 2:
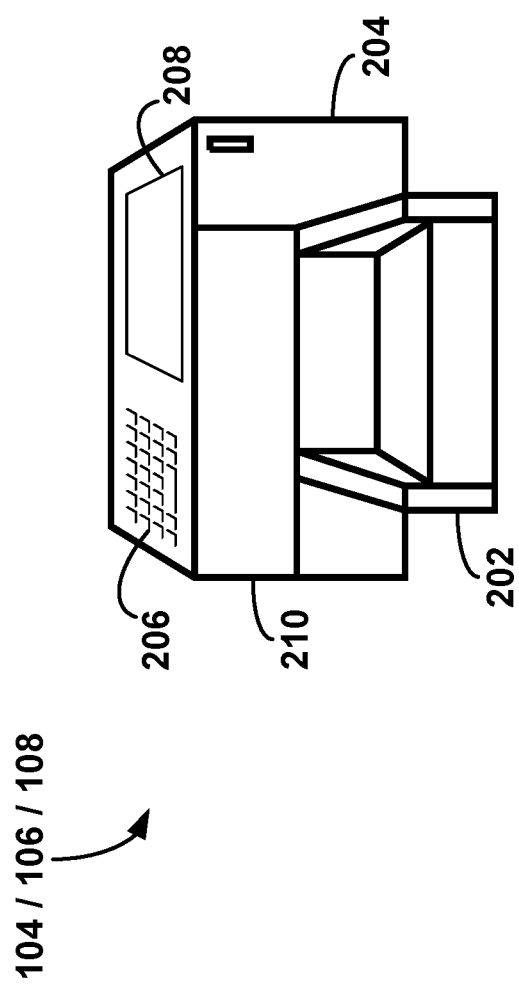
FIG. 2 is an illustration of a printing device, according to example embodiments.
Figure 3:
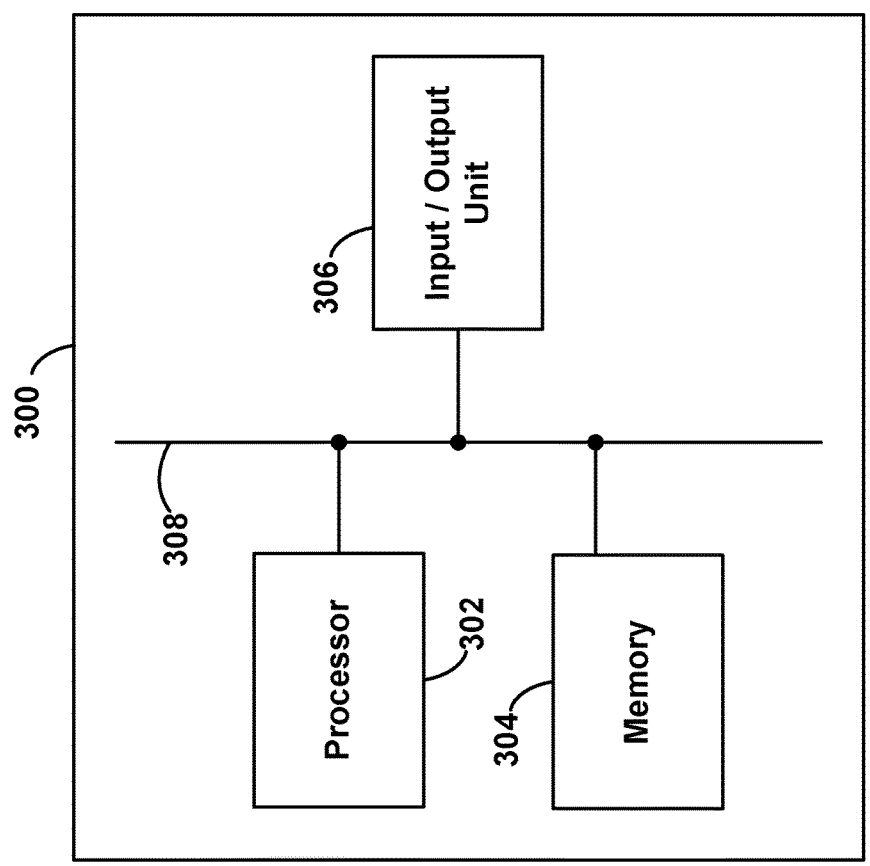
FIG. 3 is a schematic block diagram of computing components of a printing device or a management device, according to example embodiments.

The printing devices 104, 106, 108 are further detailed in FIGS. 2 and 3, and may be printers, scanners, facsimile units, or MFPs capable of performing multiple tasks. Furthermore, the image forming system 100 may contain more or fewer than three printing devices; FIG. 1 is purely provided as an example.

The management device 102 may be a desktop computing device, a laptop computing device, a tablet computing device, a mobile computing device, or a server in various embodiments. The management device 102 is responsible for monitoring the printing devices 104, 106, 108. The management device 102 may perform other tasks unrelated to printing device monitoring, as well.

The management device 102 may communicate with the printing devices 104, 106, 108 over a private network, such as a local area network (LAN), or a public network, such as the public Internet.

Additionally, the management device 102 may utilize wireless or wireline means to communicate with the printing devices 104, 106, 108. For example, the management device 102 may have a wireless connection to a router, which may route communications between members of a LAN. The printing devices 104, 106, 108 may alternatively have access to a router using a wireline interface. Using the LAN as the communication medium, the management device 102 and the printing devices 104, 106, 108 may transmit information to one another.

Still further, the printing devices 104, 106, 108 may communicate with the management device 102 using more direct means, such as a wireline connection using a Universal Serial Bus (USB) cable, a FireWire® (IEEE 1394) cable, a High-Definition Multimedia Interface (HDMI) cable, or a serial RS-232 cable. Similarly, the printing devices 104, 106, 108 may communicate locally with the management device 102 wireless using Bluetooth® or Wi-Fi® (IEEE 802.11 standard) technologies.

FIG. 2 depicts an example of one of the printing devices 104, 106, 108. The printing devices 104, 106, 108 may be configured to print partially-stored and/or fully-stored electronic documents on various types of physical output media. These output media include, but are not limited to, various sizes and types of paper, overhead transparencies, threedimensional (3D) plastics, and so on. The printing devices 104, 106, 108 may be interchangeably referred to as "printers."

The printing devices 104, 106, 108 may serve as local peripherals to a computing device, such as a personal computer, a server device, a print server, etc. In these cases, the printing devices 104, 106, 108 may be attached to the computing device by cable, such as a serial port cable, parallel port cable, USB cable, FireWire cable, or HDMI cable. These attachments may be in addition to the communicative coupling of the printing devices 104, 106, 108 to the management device 102. In this way, the computing device may serve as a source of electronic documents for the printing devices 104, 106, 108.

On the other hand, the printing devices 104, 106, 108 may include wireline or wireless network interfaces, such as Ethernet or Wi-Fi® interfaces. So arranged, the printing devices 104, 106, 108 may serve as printing devices for any number of computing devices that can communicate with the printing devices 104, 106, 108 over a network. In some embodiments, the printing devices 104, 106, 108 may serve as both a local peripheral and a networked printer at the same time.

In order to use the printing devices 104, 106, 108, computing devices may install one or more printer drivers. These printer drivers may include software components that convert electronic documents to be printed from various local representations stored on the computing devices to one or more representations supported by the printing devices 104, 106, 108.

Regardless, the printing devices 104, 106, 108 may comprise computing devices, and may carry out both printing-related and non-printing related tasks. For instance, the printing devices 104, 106, 108 may also include copier, fax, and scanner functions. In some embodiments, the printing devices 104, 106, 108 may use a scanning unit to facilitate copier and/or fax functions. For instance, the printing devices 104, 106, 108 may scan a physical document into an electronic format, and then print the resulting electronic document to provide a copy, and/or transmit the resulting electronic document via a telephone interface to provide a fax operation. Additionally, the printing devices 104, 106, 108 may be able to receive a faxed electronic document via a telephone interface, and then compress and store a representation of this electronic document.

In order to support its various capabilities, the printing devices 104, 106, 108 may include document feeders/output trays 202, paper storage 204, user interfaces 206, scanning elements 208, and chassis 210. It should be understood that the printing devices 104, 106, 108 may take on a wide variety of forms. Therefore, the printing devices 104, 106, 108 may include more or fewer components than depicted in FIG. 2, and/or components arranged in a different fashion than depicted in FIG. 2. Additionally, the printing devices 104, 106, 108 need not all take on the same form as one another.

The document feeders/output trays 202 may hold physical documents (e.g., a stack of one or more sheets of paper) that are to be scanned, copied, or faxed. Advantageously, the document feeders/output trays 202 may allow the printing devices 104, 106, 108 to automatically feed multiple physical documents for processing by the printing devices 104, 106, 108 without requiring manual intervention. The document feeders/output trays 202 may also include one or more separate output trays for holding physical documents that have been processed by the printing devices 104, 106, 108. These may include physical documents that have been scanned, copied, or faxed by the printing devices 104, 106, 108, as well as physical documents that have been produced by, e.g., the fax and/or copying functions of the printing devices 104, 106, 108.

Paper storage 204 may include trays and/or feeding elements for various types of physical media. For instance, paper storage 204 may include separate trays for 8.5×11 inch paper, A4 paper, letterhead paper, envelopes, and so on. For any operation of the printing devices 104, 106, 108 that involves outputting physical media (e.g., printing, copying, and/or receiving a fax), paper storage 204 may supply the physical media. In embodiments where the printing devices 104, 106, 108 are capable of 3D printing, the paper storage 204 may supply the physical media in the form of acrylic (polymethyl methacrylate—PMMA), acrylonitrile butadiene styrene (ABS), or polylactic acid (PLA), for example.

The user interfaces 206 may facilitate the interaction of the printing devices 104, 106, 108 with human or non-human users, such as to receive input from users and to provide output to users. Thus, the user interfaces 206 may include input components such as keypads, keyboards, touch-sensitive or presence-sensitive panels, joysticks, microphones, still cameras, and/or video cameras. The user interfaces 206 may also include one or more output components such as display screens (which, for example, may be combined with a presence-sensitive panel), cathode ray tubes (CRTs), liquid crystal displays (LCDs), light emitting diode (LED) based displays, displays using digital light processing (DLP®) technology, light bulbs, and/or one or more other similar devices, now known or later developed. The user interfaces 206 may also be configured to be able to generate audible output(s), via speakers, speaker jacks, audio output ports, audio output devices, earphones, and/or other similar devices, now known or later developed in the future.

The scanning elements 208 may be glass panels below which movable light sources operate to scan physical media placed on top of the glass panels. Alternatively, a digital camera below the glass panels may "scan" the physical media placed on top of the glass panels by taking a picture of the physical media. Images of scanned physical media may be stored in data storage associated with the printing devices 104, 106, 108.

The chassis 210 may include a physical housing that contains and/or interconnects various components of the printing devices 104, 106, 108, such as the document feeders/output trays 202, paper storage 204, the user interfaces 206, and the scanning elements 208. Additionally, the chassis 210 may house other components not shown in FIG. 2. For example, the chassis 210 may contain one or more toner cartridges, liquid ink jets, belts, rollers, and/or power supplies. Further, the chassis 210 may include communication interfaces, such as wireline and/or wireless network interfaces, telephony interfaces (e.g., an RJ45 jack), USB interfaces, Bluetooth® interfaces, card reader ports, etc.

Moreover, as the printing devices 104, 106, 108 may be based on general-purpose and/or specially-designed computing device components, the chassis 210 may also house some or all of these components. To that point, FIG. 3 depicts an example embodiment 300 of computing device components (e.g., functional elements of a computing device) that may be included in the printing devices 104, 106, 108. The computing device components presented in FIG. 3 may also be suitable components for the management device 102.

Computing device components 300 may include a processor 302, memory 304, and an input/output unit 306, all of which may be coupled by a system bus 308 or a similar mechanism. The processor 302 may include one or more central processing units (CPUs), such as one or more general purpose processors and/or one or more dedicated processors (e.g., application specific integrated circuits—ASICs or digital signal processors—DSPs, etc.).

Memory 304, in turn, may comprise volatile and/or non-volatile data storage and can be integrated in whole or in part with the processor 302. Memory 304 may store program instructions, executable by the processor 302, and data that are manipulated by the processor 302, when executing the program instructions, to carry out the various methods, processes, or functions described herein. Alternatively, these methods, processes, or operations can be defined by hardware, firmware, and/or any combination of hardware, firmware, and software. Therefore, memory 304 may include a tangible, non-transitory, computer-readable medium, having stored thereon program instructions. When one or more processors 302 execute the program instructions, the one or more processors 302 may cause the printing devices 104, 106, 108 or the management device 102 to carry out any of the methods, processes, or functions disclosed in this specification or the accompanying drawings.

Memory 304 may also be configured to store compressed and non-compressed electronic documents that may later be processed (e.g., printed or faxed). Thus, memory 304 may serve as an output medium for these electronic documents.

The input/output unit 306 may include any of the operations and/or elements described in reference to the user interfaces 206. Thus, the input/output unit 306 may serve to configure and/or control the operation of the processor 302. The input/output unit 306 may also provide output based on the operations performed by the processor 302.

These examples of printing devices 104, 106, 108 are provided for illustrative purposes. In addition to and/or alternatively to the examples above, other combinations and/or sub-combinations of printer and computer technologies may also exist, among other possibilities, without departing from the scope of the embodiments herein.

FIG. 4 is an illustration of a set of printing device activities 400 of one of the printing devices 104, 106, 108, as monitored by the management device 102, according to example embodiments. The set of printing device activities 400 includes activity times 402, activity types 404, activity weightages 406, individual activity events 408, and a total activity score 410. This illustration may, for example, depict the state of the set of printing device activities 400 after step 730, of sub-method 720, or step 778, of sub-method 760, of method 700 (later described).

The set of printing device activities 400 may be stored as a file within the memory 304 of the management device 102. Alternatively, the set of printing device activities 400 may be a portion of a larger file, also saved within the memory 304 of the management device 102, which contains the activities for all of the printing devices 104, 106, 108 currently managed by the management device 102. Further, the information displayed in the set of printing device activities 400 may have been obtained by a combination of polling events of one of the printing devices 104, 106, 108, by the management device 102 for associated device state (firmware information), and a collection of transmissions to one of the printing devices 104, 106, 108.

The activity times 402 may be time-stamps associated with the printing device activities. They may be stored as metadata associated with each activity within the management device 102, for instance. The activity times 402 may be displayed by the management device 102 on a display within the input/output unit 306 for analysis by an end-user.

In addition, the activity times 402 may aid in the calculation of activity score 410. The management device 102 may reduce the set of printing device activities 400 by creating a subset of activities that have occurred within a specified time period. Then, management device 102 may calculate the activity score 410 based only on the subset. This could prevent very old activity data from having a significant impact on current activity scores 410, thereby yielding a more accurate activity score representation of the current state of the system 100.

In other embodiments, however, the activity times 402 will indicate when the activities were collected, not when they occurred, and hence the activity times 402 will not influence the calculation of the activity score 410. It may also be the case that the management device 102 stores only activity data having activity times 402 corresponding to activities that would be used in activity score 410 calculations. In other words, the management device 102 may preemptively discard those activities whose activity times 402 indicate they will not be factored into any activity score 410 calculations. This may be done in an effort to conserve memory within the management device 102.

The activity type 404 is another example of metadata that may be included in an individual activity event 408 associated with the printing devices 104, 106, 108.

In some embodiments, the activity type 404 may be stored as a string of characters within the management device 102. The activity type 404 may then be used as a search key within a database in the management device 102. Each activity type 404 may correspond to a specific activity weightage 406. In this way, the management device 102 could use the activity types 404 as a way of looking up how much weight a specific activity should be given when calculating the activity score 410 for a particular printing device having a particular activity in its set of printing device activities 400.

Activity weightage 406 is a value that corresponds to an individual activity event 408 that indicates how much the activity should impact the total activity score 410 of the printing device. The activity weightage 406 may be stored as a double, integer, or other primitive type within the management device 102, for example. In some embodiments, the activity weightage 406 will represent a decimal score from 0 to 1. In other embodiments the activity weightage 406 may take on integer values from 1 to 100. In the embodiment depicted in FIG. 4, the activity weightage 406 is an integer value of 1, 2, 3, 4, or 5, with larger values influencing the activity score 410 more than smaller values.

Additionally, activity weightages, and consequently activity scores, may have negative values. For instance, if one of the activities occurring within the printing device were removing ten print jobs from the queue by transferring them to another printing device, the printing device would experience less use than previously anticipated. This activity of removing jobs from the queue may have a negative activity weightage 406 associated with it to indicate that the activity score should correspondingly decrease due to reduced use.

As an additional example, the printing device may become enrolled into a different network, and subsequently be remotely managed/maintained by a different management device. This would negate the need for the original management device to manage the printing device, and no more polling would be necessary. Hence, a negative activity weightage 406 may be assigned to the activity of joining a different network such that the total activity score 410 of the printing device becomes lower with respect to other managed printing devices.

The activity weightages 406 may be summed, in some embodiments, to yield the total activity score 410, as in FIG. 4. In other embodiments, the activity score 410 may be computed by taking the average value of the activity weightages 406 of the printing device.

Alternatively, the activity weightage 406 may act as an additional multiplier for another type of activity statistic used for the activity score 410 calculation. For example, the activity type 404 of "low toner" may be assigned a default activity value of 5. However, before using that activity value toward the calculation of the activity score 410, the activity weightage 406 may multiply that activity value. For instance, if the "low toner" were magenta toner, the activity weightage 406 may be "0.6", indicating that the contribution of this "low toner" activity type 404 to the activity score 410 should be 3 (5 multiplied by 0.6). If instead, though, the "low toner" were black toner, the activity weightage 406 may be "1", indicating that the contribution of this "low toner" activity type 404 to the activity score 410 should be the full 5. In this way, the activity weightage 406 could act to differentiate between the contribution of more critical and less critical forms of similar activities to the total activity score 410.

Furthermore, the activity weightage 406 may take into account the priority level, and therefore polling frequency, for the printing device being monitored. This may be done, in some embodiments, to ensure a fair comparison with other total activity scores of other printing devices. For example, if the printing device being monitored in the set of printing device activities 400 is being polled twice as frequently as another printing device, but they have the same associated device state (e.g., "out of paper" indication), the contribution to their respective activity scores of this associated device state (reflected in the respective activity weightages) may be equal per unit of time.

Therefore, if the activity scores for the printing devices are calculated by summation, the printing device being monitored in the set of printing device activities 400 would have an activity weightage for the "out of paper" indication that is half of the activity weightage for the "out of paper" indication in the printing device being polled half as frequently.

In other embodiments, however, it may be the case that the activity weightages are the same for each printing device, regardless of polling frequency. This may create a cascading activity score for those printing devices with higher activity scores because device activities are being counted more often. In other words, since those printing devices with higher activity scores have higher priority levels, they also have higher polling frequencies. If those printing devices are polled more often due to the higher polling frequencies, the weightages of device activities will be added to their activity scores more per unit time. This, in turn, may make their activity score increase more rapidly with respect to other activity scores. Therefore, the priority level and polling frequency of that printing device may increase even more, relative to other printing devices. This cascading activity score may indicate, for instance, that a printing device has been out of paper for an extended period of time.

In some embodiments, all activity types 404 will carry exactly the same weight when contributing to the total activity score 410. This may be indicated by the activity weightage 406 for each event having the same value, regardless of activity type 404.

The individual activity events 408 are depicted in the illustration 400 in FIG. 4 as an entire row. This row may be represented within the management device 102 as three entries with the same index in three different one-dimensional arrays, for instance. Further, if the individual activity events 408 are maintained as a single entity within the management device 102, it makes it easier for manual review by a user.

Additionally, the individual activity events 408 may be stored as different rows within a spreadsheet or a comma separated variables (.csv) file within the management device 102.

In alternate embodiments, the individual activity events 408 may contain additional information regarding each event. Examples of such information are origination of the activity, resolution of the activity, duration of the activity, etc.

The total activity score 410 is an amalgamation of the activity weightages 406 for each individual activity event 408. The total activity score 410 is used as a measure of how active the printing device associated with that total activity score 410 is. The total activity score 410, may be curated, in some embodiments, over only a specified number of recent events (e.g. the last 100 individual activity events 408). Alternatively, it may be curated for any number of events occurring within a specified length of time (e.g. all individual activity events 408 occurring within the last 12 hours or between 8 AM to 6 PM Monday-Friday).

Multiple methods of computing the total activity score 410 are possible, in various embodiments. One way of computing the total activity score 410 is taking the algebraic sum of all the activity weightages 406. Computing the total activity score 410 in this way equates each added individual activity events 408 with an increasing total activity score 410.

An alternate way of computing the total activity score 410 may include computing, by the management device 102, the mean or median of the activity weightages 406. This way of computing the total activity score 410 makes it possible for managed printing devices with far fewer individual activity events 408 to have comparable or higher total activity scores 410 than those managed printing devices with a much higher number of individual activity events 408.

FIG. 5 is an illustration of an ordered list 500 of multiple monitored printing devices 104, 106, 108, according to example embodiments. The ordered list 500 includes device Internet Protocol (IP) addresses 502, activity scores associated with each device 504, and priority levels associated with each device 506. This illustration may, for example, depict the state of the ordered list 500 after step 716 of method 700 (later described).

The ordered list 500 of multiple monitored printing devices 104, 106, 108 may be represented within the management device 102 as a file that is stored on a segment of non-volatile memory.

The device IP addresses 502 indicate the network name of the managed printing devices 104, 106, 108. Alternate ways of identifying the managed printing devices 104, 106, 108 may be used in various embodiments. The network locations could, instead, be identified by media access control (MAC) addresses, web addresses (uniform resource locators—URLs), or port numbers (if the printing devices 104, 106, 108 are connected locally to the management device 102).

Alternatively, a file stored within the memory 304 of the management device 102 may contain the network addresses of all of the managed printing devices 104, 106, 108, as well as associated tags that indicate nicknames provided for each printing device 104, 106, 108 by a user, such as "third floor printer." These nicknames may be displayed instead of the network addresses if the ordered list 500 of multiple monitored printing devices 104, 106, 108 is ever displayed on a display device within the management device 102.

The column representing the activity scores associated with device 504 is a collection of the total activity scores 410 of all printing devices 104, 106, 108 managed by the management device 102. The activity scores 504 are all calculated in the same fashion (sum vs. average, for example) such that they can be meaningfully compared with one another by the management device 102.

As shown in FIG. 5, the printing devices have been ranked by activity score 504, from highest to lowest. This ranking also corresponds to the assigned priority level 506 for each printing device. In some example embodiments, though, there may be a printing device ranked higher than its corresponding activity score 504 indicates relative to other printing devices. For example, certain embodiments may implement a ranking flag, stored within the management device 102, which allows a user to set the ranking of a particular printing device. This preset ranking will supersede the activity scores when ranking that printing device.

Alternatively, the management device 102, in some embodiments, may implement a priority flag. The priority flag may indicate which priority level 506 should be assigned to a particular printing device regardless of its ranking based on activity score 504.

The two types of flags described above, ranking flags and priority flags, may be used by the management device 102 to indicate those printing devices that have importance above what may be indicated by their activity score 504. As an example, a printing device that is used by a teacher in a classroom may take precedence over printing devices used by students. Even though the teacher may interact with the preassigned printing device less than the students interact with other printing devices, it may be imperative that the status of the teacher-assigned printing device be updated more regularly than the student-assigned printing device(s). Similar examples include an executive's office printer within a large corporate printing network, a specialized 3D printer within a manufacturing facility that is utilized for specialized tasks, or a printer associated with a premium user on a subscription-based management network for printing devices.

The priority levels associated with each device 506 may be strings that indicate how often the associated printing device should be polled for its associated device state. For example, a priority level 506 of "Urgent" may represent that the associated printing device should be polled every second and a priority of "Low" may represent that the associated printing device should be polled every ten minutes.

The number of unique priority levels within the management device 102 may be configurable. Additionally, how many managed printing devices are associated with a specific priority level, either by percentage or by number, may also be configurable.

Further, the number of printing devices associated with each priority level may dynamically change based on the amount of computing resources available within the management device 102. For example, if there are no other tasks occupying the computing resources of the management device 102, there may be 20% of the printing devices associated with the priority level 506 of "Urgent". However, if the management device 102 is executing many other tasks with its computing resources, there may be only 5% of the printing devices associated with the priority level 506 of "Urgent". The amount that the computing resources affects the number of printing devices associated with each priority level 506 may be configurable.

Alternatively, integers, floats, or doubles could be used, instead of strings, to indicate the priority levels 506 (e.g. the priority levels range from "1" to "10", with "10" being the highest priority and "1" being the lowest).

Figure 6:
FIG. 6 is an illustration of a handicapping of an ordered list of multiple monitored printing devices, according to example embodiments.

FIG. 6 is an illustration of a handicapping (resetting) of an ordered list of multiple monitored printing devices 104, 106, 108, according to example embodiments. This illustration may, for example, depict the transition that occurs during sub-method 740 of method 700 (later described).

The handicapping process depicted in FIG. 6 is a method of resetting the activity scores 504. This may occur, in various embodiments, over various timescales (e.g., every morning at 4 AM, every Monday morning at 8 AM, the first of every month at 6 AM, etc.). In one example embodiment illustrated in FIG. 6, the activity scores 504 are reset overnight between the hours of 10:00 PM on Jan. 22, 2016 and 6:00 AM on Jan. 23, 2016.

One rationale for resetting the activity scores 504 overnight, for example, is to allow newly monitored printing devices a chance to compete with established printing devices in terms of activity score. For instance, newly monitored printing devices may begin with an activity score of 0 and then accrue activity score thereafter. If the activity scores 504 were a running total, computed by summation, of all activities (weightages) occurring within a printing device since the printing device joined the network, a printing device that has been in use for over a year may have an insurmountable activity score 504 advantage over a new printing device added to the network, even if the new printing device is used more frequently in the near future.

In addition, the handicapping process may occur at different times or with different frequencies for each printing device. For example, if, within a group of managed printing devices 104, 106, 108, there are some printing devices that are used only on Thursdays and Fridays and some printing devices that are used all week, it may be pertinent to reset the activity scores 504 every Monday and Thursday for the printing devices that are used all week, and only reset the activity scores every Thursday for the printing devices that are used only on Thursdays and Fridays, in order to maintain a meaningful activity score relationship between the two sets at all times. For certain embodiments, the times at which or frequency with which the handicapping occurs may be configurable.

The handicapping, itself, may be executed in multiple ways in various embodiments. One example way would be providing, by the management device 102, a handicap score for each printing device 104, 106, 108. This handicap score, which may be configurable, may include a number used in resetting each activity score. This number may be the activity score 504 to which the associated printing device should be reset, it may be a percentage of the current activity score to which the activity score 504 should be reset, it may be the number of points that should be subtracted from the current activity score for that particular printing device, etc.

Additionally, the handicap value associated with each printing device may be dependent on the priority level associated with each printing device prior to the resetting (as depicted in FIGS. 5 and 6). Therefore, even though a subset of printing devices are being reset to lower activity score values, those printing devices that had previously established a higher activity score will maintain a competitive edge over the other printing devices, even after resetting. Again, the breakdown of what handicap value is applied to each priority level and the distribution between those handicap values may be configurable, in certain embodiments.

In alternate embodiments, the handicap value may be calculated by breaking up the pre-handicapped activity scores into categories, based on the highest activity score of all printing devices. As an example, if the maximum activity score 504 before handicapping had a value of 150, as in FIG. 6, and the handicap values were broken down into five categories, each category would hold activity scores ranging over 30 values (150±5=30). If this were the case, again using the pre-handicapped activity scores of FIG. 6 as an example, the categories would be broken down into activity scores of 0-30, 31-60, 61-90, 91-120, and 121-150. Therefore, respectively, the handicap values corresponding to those categories may be 1, 2, 3, 4, and 5. If this were the case, IP address 192.168.1.2 would instead have a post-handicapped activity score of 5, IP address 192.168.1.3 would instead have a post-handicapped activity score of 3, and IP address 192.168.1.7 would instead have a post-handicapped activity score of 1, if using the example pre-handicapped activity scores of FIG. 6.

In still further embodiments, the handicap value for each printing device may be calculated based on an average activity score difference between printing devices prior to handicapping. For example, a measure of the average difference in FIG. 6 may be calculated by subtracting the lowest activity score from the highest, and dividing by the number of printing devices. This yields an average activity score difference of $$16\frac{2}{3}\left(\frac{150-0}{9}\right).$$

Thus, IP address 192.168.1.2 may be given a handicap value of $$17\left(16\frac{2}{3} \times \frac{150}{150} = 16\frac{2}{3} \approx 17\right),$$

whereas IP address 192.168.1.9 may be given a handicap value of $$4\left(16\frac{2}{3} \times \frac{32}{150} = 3\frac{5}{9} \approx 4\right).$$

Furthermore, the initialization of the printing device management on the management device 102 may occur in a similar fashion to a handicapping process, except all devices may be handicapped to the same initial activity score 504 (an activity score of 0, for example).

Because all devices would have the same activity scores 504 on startup, the management device may need to find an additional way to rank the printing devices initially added to the ordered list 500 on initialization. This may be done based on the discovery order of the printing devices 104, 106, 108 (i.e., the earlier a particular printing device is discovered, the higher it is ranked). Therefore, those printing devices that are most quickly discovered using device discovery may initially have the highest priority levels 506.

Furthermore, the management device 102 may be configured to handle the case where a printing device goes offline or leaves a network, but returns prior to the next reset event. This could be handled in various ways. In some embodiments, the printing device will maintain the same activity score 504 it had prior to leaving the network or going offline. In other embodiments, the printing device may be handicapped some amount of activity score 504. In still other embodiments, the printing device may have its activity score 504 reset to 0 or some other initialization value.

III. EXAMPLE PROCESSES

Figure 7A:
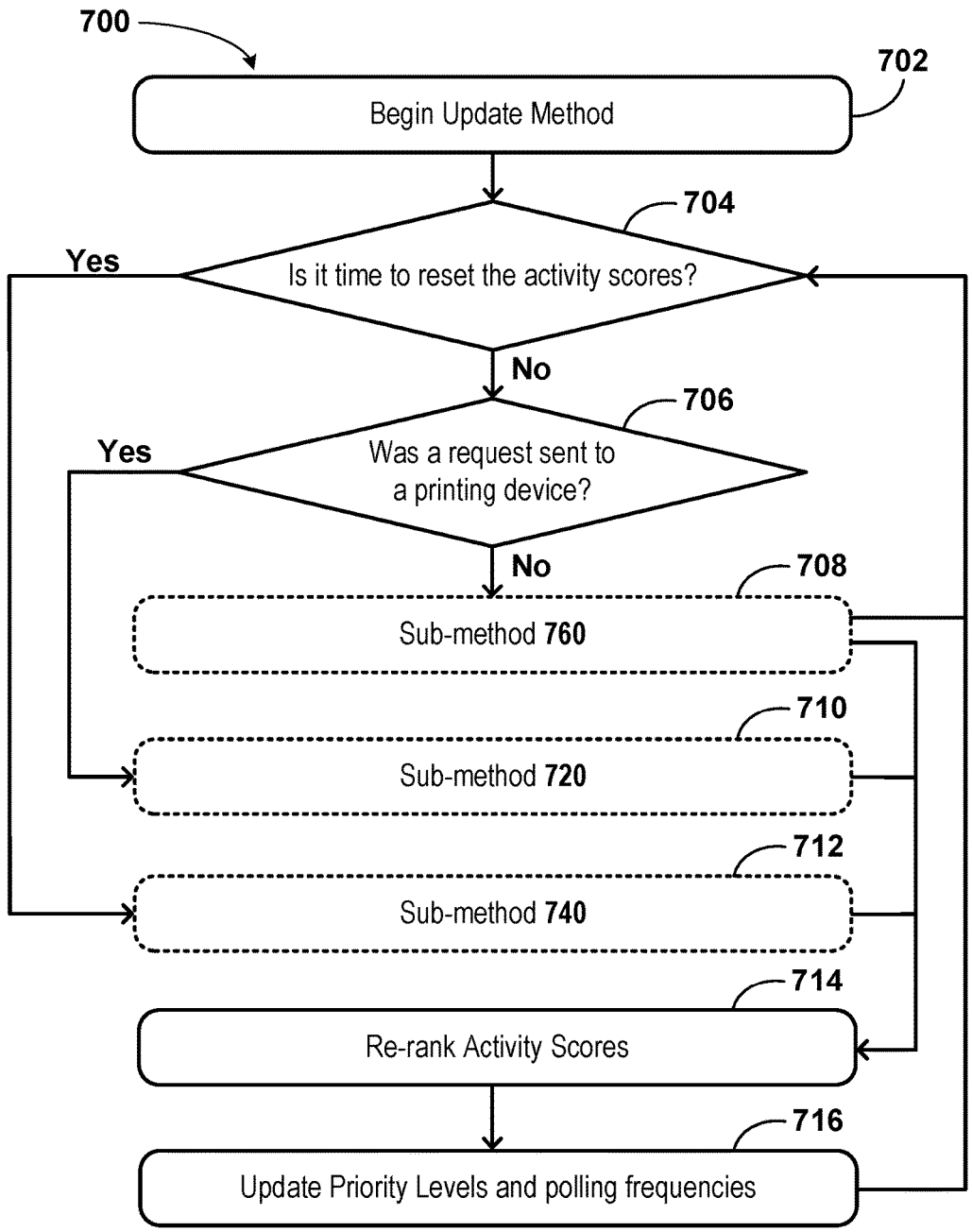
FIG. 7a is a flow chart of a method, according to example embodiments.

FIG. 7a is a flow chart illustrating a method 700, according to example embodiments.

At step 702, the method 700 includes beginning the update method. This may include, in some embodiments, the processing device 302 within the management device 102 initiating the execution of instructions stored within the memory 304 within the management device 102. This may further include, in some embodiments, temporarily transferring a set of instructions from non-volatile memory within the management device 102 to volatile memory within the management device 102 for rapid access during execution by the processing device 302.

Alternatively, step 702 may include the processing device initiating communication with a web service by executing web instructions on a web server through a web browser.

Step 702 may, in some embodiments, occur in response to a user request communicated through the input unit 306 within the management device 102, such as a keyboard, mouse, or touch-panel. Additionally, step 702 may be initiated by a remote request communicated to the management device 102.

Step 702 may also be executed within the management device 102 when a request is transmitted to one of the printing devices 104, 106, 108, which allows the activity scores to be updated soon after the transmission of requests.

At step 704, the method 700 includes determining if the time has come to reset the activity scores associated with the printing devices 104, 106, 108. If it is determined that the time has come, the method 700 proceeds to step 712 of method 700. If it is determined that the time has not come, the method 700 proceeds to step 706 of method 700.

Step 704 may include comparing a current timestamp to a threshold time value stored within the management device 102, and determining if the current timestamp is later than the threshold time value. Alternatively, step 704 may include subtracting a previous timestamp from the current timestamp to determine an amount of time that has passed. The value resulting from the subtraction may then be compared to a threshold time difference to see if the value resulting from the subtraction is larger than the threshold.

The time to reset the activity scores may be configurable. The management device 102 may have a reset interval flag that allows the time between activity score resets to be stored. For example, the reset interval flag may indicate to reset the activity scores of all printing devices in the network every 12 hours.

Alternatively, in some embodiments, the management device 102 may have a time reset flag that allows the time and day of resets to be stored. For example, the time reset flag may indicate that every weekday at 8 AM or that on the first and third Tuesdays of every month at 3 AM, the activity scores should be reset.

At step 706, the method 700 includes determining if there was a request sent to a printing device. If it is determined that there was a request sent to a printing device, the method 700 proceeds to step 710. If it is determined that there was not a print request sent to a printing device, the method 700 proceeds to step 708.

Step 706 may include the management device 102 opening a communications log file stored within the memory 304, and reading the file to determine if a request was transmitted. There may be, associated with the communications log file, a timestamp indicating the last time the file was opened/read to determine if a request was transmitted. This may allow the management device 102 to only scan those log entries created since that previous timestamp or appended to the file after a certain location within the file, if the file were sorted by timestamp.

Furthermore, step 706 may, in some embodiments, include polling other devices that are using the various printing devices 104, 106, 108 to determine if they have sent one or more requests to one or more of the various printing devices 104, 106, 108 since the last time the request status was determined.

The requests being analyzed in step 706 may include, for example, printing requests, network status requests, remaining paper inquiries, remaining toner inquiries, current print job status requests, number of jobs queued inquiries, etc.

At step 708, the method 700 includes proceeding through sub-method 760.

At step 710, the method 700 includes proceeding through sub-method 720.

At step 712, the method 700 includes proceeding through sub-method 740.

At step 714, the method 700 includes re-ranking the current listing of all activity scores of presently monitored printing devices 104, 106, 108. Step 714, may, in some embodiments, include the processing device within the management device 102 altering a file stored within non-volatile memory. This file may contain a list of all the managed printing devices 104, 106, 108, as well as their associated activity scores and/or priority levels. The file may contain information similar to that depicted in FIG. 5.

At step 716, the method 700 includes evaluating the list of activity scores that was re-ranked in step 714 and updating the priority levels based on the new rank of each printing device. Further, at step 716, the method 700 includes updating the polling frequency for each printing device to correspond to the newly updated priority levels. The polling frequencies may also be stored within a file in the memory 304 of the management device 102. In some embodiments, the polling frequency will be the same for each printing device 104, 106, 108 within a given priority level. Alternatively, the polling frequencies may depend on priority level, but be unique for each device, allowing other factors such as location to additionally influence the polling frequencies.

At the conclusion of step 716, the method 700 reverts to step 704 and proceeds from there. This method continues ad infinitum until interrupted or cancelled by the management device 102.

Figure 7B:
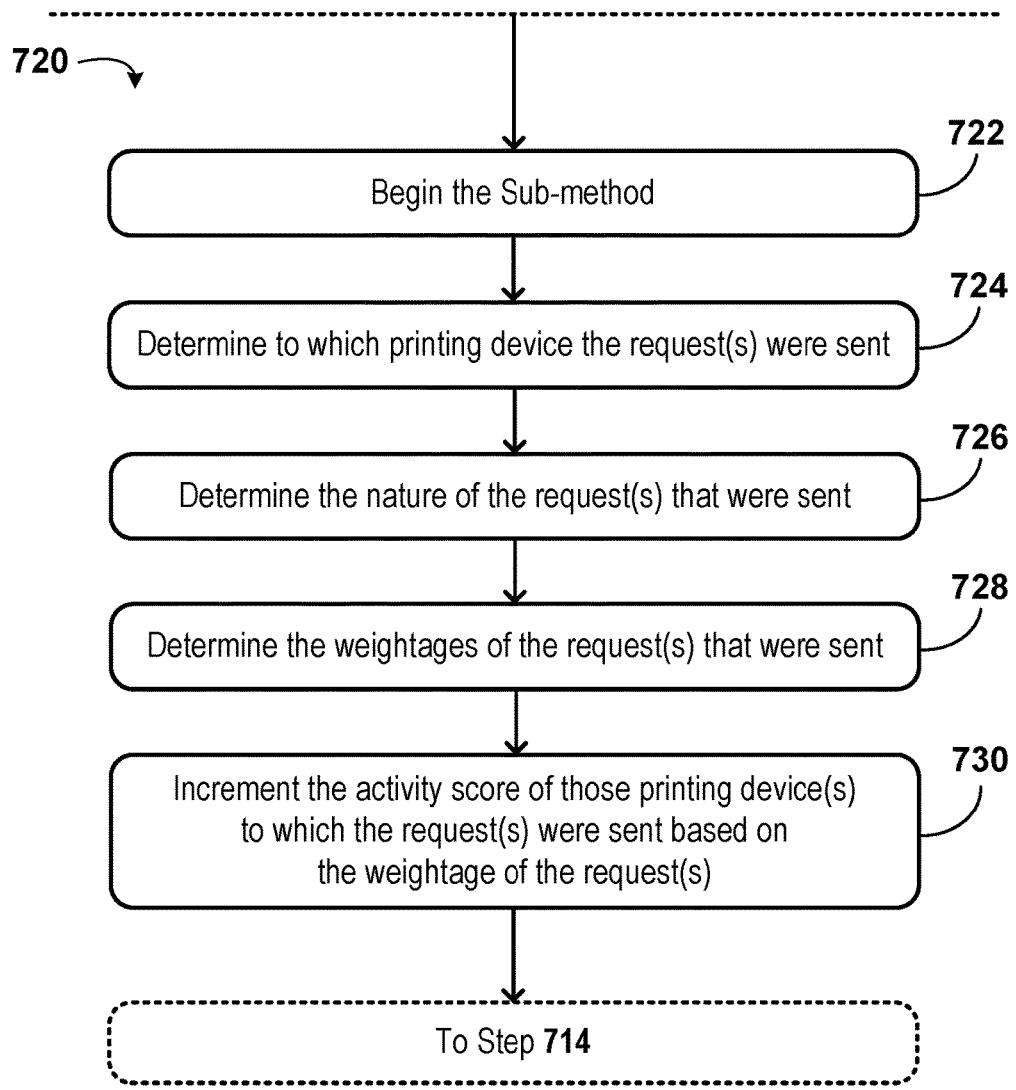
FIG. 7b is a flow chart of a sub-method of the method in FIG. 7a, according to example embodiments.

FIG. 7b is a flow chart illustrating a sub-method 720 of method 700, according to example embodiments.

At step 722, the sub-method 720 includes beginning the update method. This may include, in some embodiments, the processing device 302 within the management device 102 initiating the execution of instructions stored within the memory 304 within the management device 102. This may further include, in some embodiments, temporarily transferring a set of instructions from non-volatile memory within the management device 102 to volatile memory within the management device 102 for rapid access during execution by the processing device 302.

The instructions initiated in step 722 may be a subset of the instructions initiated in step 702. Alternatively, the instructions executed in step 722 may be unique instructions for sub-method 720, contained elsewhere in the memory 304 of the management device 102.

At step 724, the sub-method 720 includes determining to which printing devices the requests were sent. This information may further be contained within the communication log discussed in relation to step 706. Therefore, step 724 may include the management device 106 opening the communications log file, and reading the associated IP addresses for those requests that were transmitted within the last specified amount of time.

In some embodiments, step 724 may include the management device 102 requesting the IP addresses of printing devices to which requests were sent from other computing devices. For example, if a mobile computing device recently transmitted a print request to a specific printing device, step 724 may include the management device 102 polling the mobile computing device for information regarding the printing device to which the mobile computing device transmitted the request.

At step 726, the sub-method 720 includes determining the nature of the requests that were sent to the printing devices. This information may additionally be contained within the communications log file in the management device 102.

Alternatively, it could be requested from other computing devices that have transmitted requests to specific printing devices, as in step 724. In some embodiments, the nature of the requests and the devices to which the requests were sent will be gathered from outside computing devices by the management device 102 at the same time.

At step 728, the sub-method 720 includes determining the weightages of the requests that were sent. In some embodiments, the weightages of the requests will directly correlate with the nature of the requests. These weightages may be in lookup tables contained within the memory 304 of the management device 102. For instance, the nature of the requests discovered in step 726 may act as a search key, yielding the weightages as the result of the search.

In alternate example embodiments, the management device 102 may use such factors as location of the device, time of the request, and sender of the request to formulate a weightage for each request. The weightages indicate the amount the specific requests impact the activity scores for the devices discovered in step 724.

At step 730, the sub-method 720 includes incrementing the activity score of those printing devices to which the requests were sent based on the weightages of the requests. Incrementing the activity score may include modifying a temporary activity score file stored within the management device 102 in the memory 304.

At the conclusion of step 730, the sub-method 720 proceeds to step 714 of method 700.

Figure 7C:
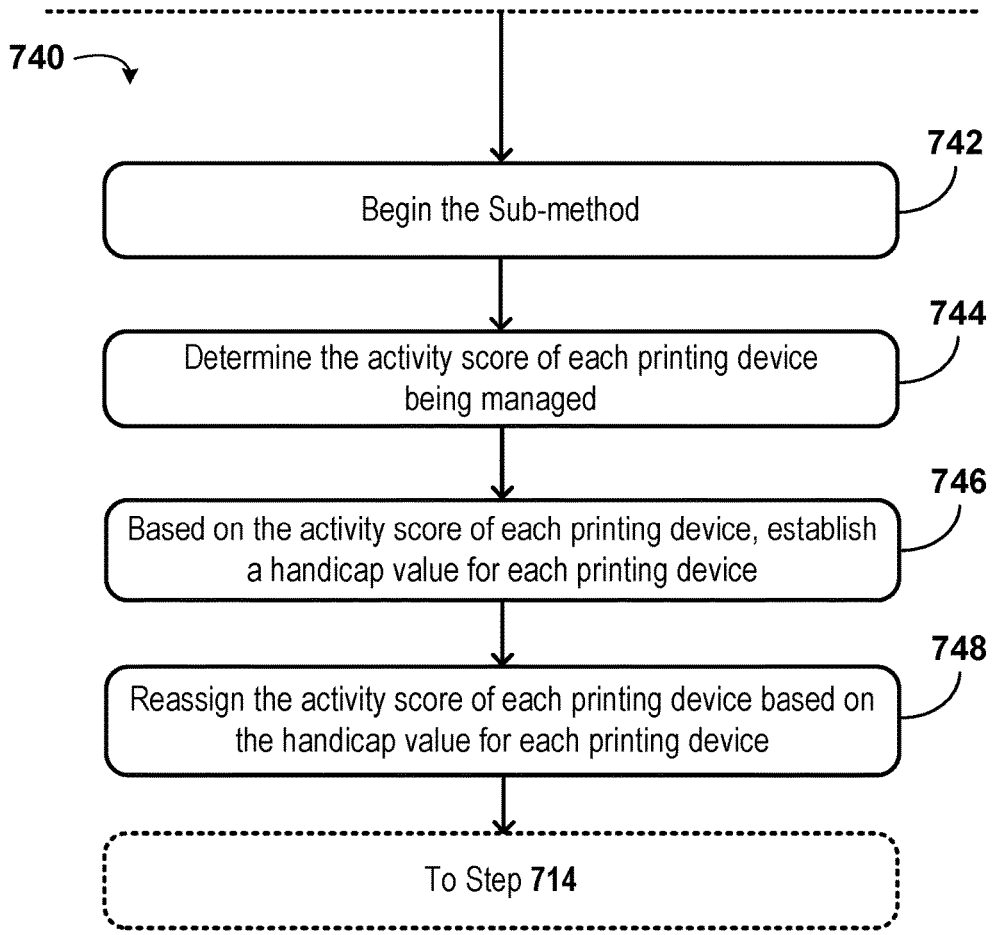
FIG. 7c is a flow chart of a sub-method of the method in FIG. 7a, according to example embodiments.

FIG. 7c is a flow chart illustrating a sub-method 740 of method 700, according to example embodiments.

At step 742, the sub-method 740 includes beginning the update method. This may include, in some embodiments, the processing device 302 within the management device 102 initiating the execution of instructions stored within the memory 304 within the management device 102. This may further include, in some embodiments, temporarily transferring a set of instructions from non-volatile memory within the management device 102 to volatile memory within the management device 102 for rapid access during execution by the processing device 302.

The instructions initiated in step 742 may be a subset of the instructions initiated in step 702. Alternatively, the instructions executed in step 742 may be unique instructions for sub-method 740, contained elsewhere in the non-transitory, computer-readable medium of the management device 102.

At step 744, the sub-method 740 includes determining, by the management device, the activity score of each printing device being managed. This may include reading the activity scores from a file stored within the memory 304 of the management device 102. In other embodiments, this may include reading the activities and the weightages for each of the printing devices 104, 106, 108 from a file within the memory 304 of the management device 102, and then subsequently computing, using the processor 302 within the management device 102, the activity scores for each of the processing devices 104, 106, 108.

At step 746, the sub-method 740 includes establishing a handicap value for each printing device based on the activity score of each printing device. The handicap value may be provided to aid in the resetting of activity scores, as depicted in FIG. 6. The handicap value may additionally be based on the current priority level of each printing device.

Alternatively, in some embodiments, the handicap value for each printing device may be configurable. This configurability may be partial (used in conjunction with the activity scores and/or priority levels) or complete (used to override the otherwise established handicap value entirely).

For example, a user may be able to assign, within the management device 102, a set of printing devices an advantage each time the activity scores are reset by resetting them to a higher value. If a printing device is only used in the afternoon, but the reset of the activity scores for printing devices occurs every morning, it may be necessary to provide a handicap score for that device such that even though it has low activity in the morning, it is still competitive throughout the day with the printing devices that are used all day. This can serve as a way to ensure that when, in the afternoon for example, a large influx of users of that printing device occurs, the printing device is being polled regularly for device status, even though it has not been accruing activity score all morning. In this way, issues such as low toner and lack of paper can still be monitored appropriately after the large influx of users.

At step 748, the sub-method 740 includes reassigning the activity score of each printing device based on the handicap value for each printing device. This may include overwriting the activity scores stored within a file in the memory 304 within the management device 102.

At the conclusion of step 748, the sub-method 740 proceeds to step 714 of method 700.

Figure 7D:
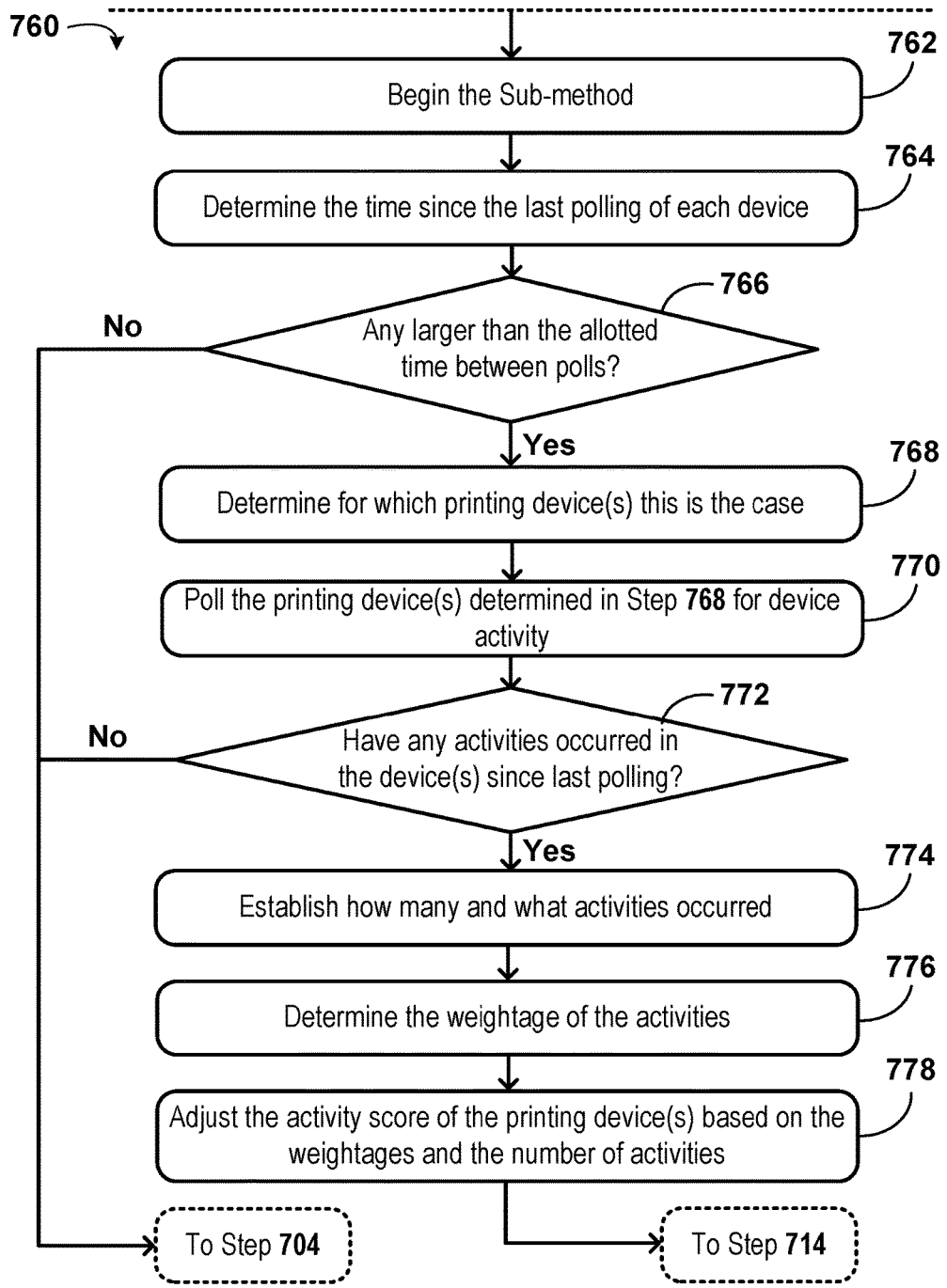
FIG. 7d is a flow chart of a sub-method of the method in FIG. 7a, according to example embodiments.

FIG. 7d is a flow chart illustrating a sub-method 760 of method 700, according to example embodiments.

At step 762, the sub-method 760 includes beginning the update method. This may include, in some embodiments, the processing device 302 within the management device 102 initiating the execution of instructions stored within the memory 304 within the management device 102. This may further include, in some embodiments, temporarily transferring a set of instructions from non-volatile memory within the management device 102 to volatile memory within the management device 102 for rapid access during execution by the processing device 302.

The instructions initiated in step 762 may be a subset of the instructions initiated in step 702. Alternatively, the instructions executed in step 762 may be unique instructions for sub-method 760, contained elsewhere in the non-transitory, computer-readable medium of the management device 102.

At step 764, the sub-method 760 includes determining, by the management device, the time since the last polling of each printing device. This may include reading a communications log file stored within the memory 304 of the management device 102. The communications log file may have a list of polling events for each of the managed printing devices 104, 106, 108, and associated timestamps for their most recent polling events. This log file may be updated each time step 770 of sub-method 760 is executed.

At step 766, the sub-method 760 includes determining if the time since the last polling event is greater than the time allotted between polling events for any of the printing devices, based on the current polling frequency for each printing device. If the time is not greater for any of the printing devices, then sub-method 760 reverts to step 704 of method 700. If the time is greater for at least one of the printing devices, then sub-method 760 proceeds to step 768.

Step 766 may include reading a configuration file stored in the memory 304 of the management device 102 to determine the allotted time between polling events for each of the managed printing devices. Alternatively, in some embodiments, the configuration file may store only a polling frequency for each of various priority levels. In this case, the management device 102 may read the priority levels for each printing device from a separate file, and then, using these two pieces of information (frequency for each priority level and priority level for each printing device), synthesize the polling frequency allotted between polling events.

Step 766 may further include the management device 102 reading the current time from a timestamp that is accessible to the processing device within the management device 102. Alternatively, the management device 102 may cull the current time from a networked source, such as a network printing device, another computing device, or a server (such as a server accessed over the public Internet).

If the time between the current time and the most recent polling event is longer than allotted, the management device 102 has determined that another polling event should occur. If the time between the current time and the most recent polling event is shorter than allotted, the management device 102 has determined that another polling event is not required at this time.

At step 768, the sub-method 760 includes determining, by the management device, for which printing devices is the polling time since the last polling greater than the time allotted between polling events.

Step 768 may include performing steps 764 and 766 for each managed printing device 104, 106, 108 and writing all those whose time since the last polling event is larger than the time allotted to a file stored within the memory 304 of the management device 102.

At step 770, the sub-method 760 includes polling the printing device(s) determined in step 768 of sub-method 760 for their device activity. Polling is the process by which the management device 102 pings the managed printing devices 104, 106, 108 for information regarding their associated device states.

Step 770 may include the management device 102 transmitting a simple network management protocol (SNMP) GetRequest to the managed printing devices 104, 106, 108 that require polling.

At step 772, the sub-method 760 includes determining if any activities have occurred within the polled printing device(s) since the last polling event. If activities have occurred, the sub-method 760 proceeds to step 774 of sub-method 760. If no activities have occurred, sub-method 760 reverts to step 704 of method 700.

Step 772 may include the management device 102 receiving a copy of an activity log for each polled printing device from each printing device. These activity logs may contain a list of all activities occurring within the given printing device within a specified range of time.

Alternatively, step 772 may include management device 102 receiving the current associated device state from each monitored printing device. The current device state may indicate the status of every aspect of the printing device (i.e., toner level, paper level, pending print requests, network card enabled/disabled, open chassis, dirty scanning device, etc.) or it may indicate a subset of each aspect of the printing device, such as only the ones that require user attention.

This log or current device status may be stored within the management device 102 and compared to an internal log maintained by the management device 102 for each printing device and updated with the results of each polling event. Thus, in step 772, if, for example, the internal log indicates that after the last polling, there were 72 sheets of paper left, and when comparing with the new log from the printing device, it is discovered by the management device 102 that there are now 150 sheets of paper remaining, it can be deduced by the management device 102 that an event of a user refilling the paper tray has occurred since the last polling.

At step 774, the sub-method 760 includes establishing, by the management device, how many activities have occurred within the polled printing device(s) since the last polling event(s). In addition, at step 774, the sub-method 760 includes determining, by the management device 102, which types of activities occurred within the polled printing device(s) since the last polling event.

Step 774 may further include comparing or reviewing the log or current device status, as discussed with respect to step 772, to extract the identifiers of activities that have occurred since the last polling events. These activity identifiers may further be stored in a recently polled activities log file within the management device 102, in some embodiments.

At step 776, the sub-method 760 includes determining, by the management device 102, the weightages associated with each activity that has occurred within the polled printing device(s) since the last polling event. The activity identifier(s) described in step 774 may also include weightage(s), indicating how each activity should affect the activity score for that particular printing device.

In some embodiments, step 776 may include using the activity identifier(s) from step 774 as a search key within a weightages file (database) stored within the management device 102. The weightages file (database) may include a list of all possible activities occurring within managed printing devices. This list would comprise possible search keys of activity identifiers and may be linked to associated data values that represent the weightages for a given search key.

The weightages may be universal across all activities on all managed devices (e.g. a paper jam is associated with a weightage value of "5"). Alternatively, the weightages may be specified with the activity identifier for each individual activity for each individual printer (e.g. an "out of colored toner" indication may be associated with a weightage value of "5" on a color printer, whereas it is associated with a weightage value of "0" on a black and white only printer).

At step 778, the sub-method 760 includes adjusting the activity score of the printing device(s) that were polled based on the weightages and the number of activities that occurred within the polled printing device(s) since the last polling event. This may include modifying an activity score file within the management device 102.

Additionally, in some instances, "adjusting the activity score" may include lowering the activity score by a certain amount. For example, if the weightage of the activity of the polled printing device(s) were negative, step 778 would include reducing the activity score of the polled printing device(s).

At the completion of step 778, the sub-method 760 proceeds to step 714 of method 700.

IV. CONCLUSION

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed:

1. A printing device management system, comprising:
one or more printing devices, wherein each of the one or more printing devices has one or more associated device states; and
a management device, comprising:
  a printing device controller, wherein the printing device controller is configured to:
    poll each of the one or more printing devices for the one or more associated device states; and
    transmit one or more requests to each of the one or more printing devices; and
  a non-transitory, computer-readable medium, with instructions stored thereon, wherein when a processing device within the management device executes the instructions, the processing device performs to:
    maintain an activity score for each of the one or more printing devices,
    wherein the activity score is based on the one or more associated device states and the one or more requests, both defined over a first specified length of time, and
    wherein the activity score of each of the one or more printing devices is reset every second specified length of time;
    rank each of the one or more printing devices based on the activity score of each of the one or more printing devices; and
    establish a frequency, for each of the one or more printing devices, over which to poll each of the one or more printing devices, based on the rank of each of the one or more printing devices.

2. The printing device management system of claim 1, wherein ranking each of the one or more printing devices further comprises associating, within the management device, each of the one or more printing devices with one or more priority levels.

3. The printing device management system of claim 2, wherein the number of priority levels is configurable.

4. The printing device management system of claim 2, wherein the processing device adjusts the number of priority levels while executing the instructions.

5. The printing device management system of claim 2, wherein the number of printing devices permitted to be associated with each of the one or more priority levels is configurable.

6. The printing device management system of claim 2, wherein how frequently the association between each of the one or more printing devices and the one or more priority levels can change is configurable.

7. The printing device management system of claim 1, wherein the processing device adjusts the rank of one or more of the one or more printing devices while executing the instructions.

8. The printing device management system of claim 1, wherein the rank of a subset of the one or more printing devices is further based on one or more sticky flags indicating the rank of the subset of the one or more printing devices regardless of activity score.

9. The printing device management system of claim 1, wherein the frequency over which to poll each of the one or more printing devices is increased when the available processing resources in the processing device increase.

10. The printing device management system of claim 1, wherein each of the one or more associated device states has a weightage value that acts as a multiplier for each of the one or more associated device states, thereby varying the amount each of the one or more device states impacts the activity score of each of the one or more printing devices.

11. The printing device management system of claim 1, wherein the one or more associated device states are selected from the group consisting of low toner level, threshold number of pending jobs, open paper tray, paper tray empty, paper jam, and network communication disruption.

12. The printing device management system of claim 1,
wherein resetting the activity score of each of the one or more printing devices comprises computing a handicap value for each of the one or more printing devices, and
wherein the handicap value indicates to what value the activity score should be reset for each of the one or more printing devices.

13. The printing device management system of claim 12, wherein the handicap value for each of the one or more printing devices is dependent upon the activity score of each of the one or more printing devices prior to the reset.

14. A method for managing one or more printing devices, comprising:
polling, by a device controller within a management device, one or more printing devices, wherein each of the one or more printing devices has one or more associated device states;
maintaining, by a processing device within the management device executing a set of instructions stored on a non-transitory, computer-readable medium, an activity score for each of the one or more printing devices,
wherein the activity score is based on the one or more associated device states and one or more requests transmitted from the device controller to each of the one or more printing devices, both defined over a first specified length of time, and
wherein the activity score of each of the one or more printing devices is reset every second specified length of time;
ranking, by the processing device within the management device executing a set of instructions stored on a non-transitory, computer-readable medium, each of the one or more printing devices based on the activity score of each of the one or more printing devices; and
establishing, by the processing device within the management device executing a set of instructions stored on a non-transitory, computer-readable medium, a frequency, for each of the one or more printing devices, over which to poll each of the one or more printing devices, wherein the frequency for each of the one or more printing devices is based on the rank of each of the one or more printing devices.

15. The method of claim 14, wherein ranking each of the one or more printing devices further comprises associating, within the management device, each of the one or more printing devices with one or more priority levels.

16. The method of claim 14,
wherein resetting the activity score of each of the one or more printing devices comprises computing a handicap value for each of the one or more printing devices, and
wherein the handicap value indicates to what value the activity score should be reset for each of the one or more printing devices.

17. The method of claim 14, wherein the rank of a subset of the one or more printing devices is further based on one or more sticky flags indicating the rank of the subset of the one or more printing devices regardless of activity score.

18. The method of claim 14, wherein the frequency over which to poll each of the one or more printing devices is increased when the available processing resources in the processing device increase.

19. A management device configured to manage printing devices, comprising:
a printing device controller, wherein the printing device controller is configured to:
poll each of one or more printing devices for one or more associated device states; and
transmit one or more requests to each of the one or more printing devices; and
a non-transitory, computer-readable medium, with instructions stored thereon, wherein when a processing device within the management device executes the instructions, the processing device performs to:
maintain an activity score for each of the one or more printing devices,
wherein the activity score is based on the one or more associated device states and the one or more requests, both defined over a first specified length of time, and
wherein the activity score of each of the one or more printing devices is reset every second specified length of time;
rank each of the one or more printing devices based on the activity score of each of the one or more printing devices; and
establish a frequency, for each of the one or more printing devices, over which to poll each of the one or more printing devices, based on the rank of each of the one or more printing devices.

20. The management device of claim 19, wherein each of the one or more associated device states has a weightage value that acts as a multiplier for each of the one or more associated device states, thereby varying the amount each of the one or more device states impacts the activity score of each of the one or more printing devices.

* * * * *